United States Patent
Kang et al.

(10) Patent No.: US 9,618,963 B2
(45) Date of Patent: Apr. 11, 2017

(54) POWER MANAGEMENT APPARATUS AND MULTI-SOURCE ENERGY HARVESTING SYSTEM USING THE SAME

(71) Applicant: ELECTRONICS AND TELECOMMUNICATIONS RESEARCH INSTITUTE, Daejeon (KR)

(72) Inventors: Taewook Kang, Daejeon (KR); Sungeun Kim, Daejeon (KR); Kyunghwan Park, Daejeon (KR); Sungweon Kang, Daejeon (KR); Taeyoung Kang, Seoul (KR); Kyungsoo Kim, Daejeon (KR); Jungbum Kim, Daejeon (KR); Hyungil Park, Daejeon (KR); Ingi Lim, Daejeon (KR); Byounggun Choi, Daejeon (KR); Changhee Hyoung, Daejeon (KR); Junghwan Hwang, Daejeon (KR)

(73) Assignee: ELECRONICS AND TELECOMMUNICATIONS RESEARCH INSTITUTE, Daejeon (KR)

(*) Notice: Subject to any disclaimer, the term of this patent is extended or adjusted under 35 U.S.C. 154(b) by 393 days.

(21) Appl. No.: 14/341,884

(22) Filed: Jul. 28, 2014

(65) Prior Publication Data
US 2015/0066233 A1    Mar. 5, 2015

(30) Foreign Application Priority Data
Aug. 28, 2013 (KR) .......................... 10-2013-0102143

(51) Int. Cl.
G06F 1/04 (2006.01)
G06F 1/06 (2006.01)
G06F 1/26 (2006.01)

(52) U.S. Cl.
CPC ................. *G06F 1/04* (2013.01); *G06F 1/06* (2013.01); *G06F 1/263* (2013.01)

(58) Field of Classification Search
None
See application file for complete search history.

(56) References Cited

U.S. PATENT DOCUMENTS

| | | | | |
|---|---|---|---|---|
| 2011/0260536 A1* | 10/2011 | Roy | ................... | H01L 31/02021 307/46 |
| 2012/0187897 A1* | 7/2012 | Lenk | ..................... | H01M 10/44 320/101 |
| 2014/0210423 A1* | 7/2014 | Goto | ................... | H01L 41/1138 320/139 |

FOREIGN PATENT DOCUMENTS

| | | |
|---|---|---|
| JP | 2006-012689 A | 1/2006 |
| KR | 10-1999-0009796 A | 2/1999 |
| KR | 10-2010-0129005 A | 12/2010 |

OTHER PUBLICATIONS

A. Romani, M. Filippi and M. Tartagni, "Micropower Design of a Fully Autonomous Energy Harvesting Circuit for Arrays of Piezoelectric Transducers," in IEEE Transactions on Power Electronics, vol. 29, No. 2, pp. 729-739, Feb. 2014, date of publication Apr. 12, 2013.*

(Continued)

*Primary Examiner* — Christopher E Everett
(74) *Attorney, Agent, or Firm* — Rabin & Berdo, P.C.

(57) ABSTRACT

Disclosed is a power management apparatus and a multi-source energy harvesting system using the apparatus, which manage power supplied by individual harvesting sources without wasting the power, thus efficiently distributing the (Continued)

power to a battery. The power management apparatus includes a plurality of comparison units configured to compare voltages of storage devices respectively connected to output terminals of a plurality of harvesting power sources with a preset threshold voltage. A control unit is configured to control an operation of the power management apparatus. A plurality of switching units are installed between the storage devices and a battery and are configured to be turned on/off in response to switching control signals output from the control unit and to form power transmission paths between corresponding storage devices and the battery. The control unit generates and provides the switching control signals based on output signals of the comparison units.

16 Claims, 6 Drawing Sheets

(56) References Cited

OTHER PUBLICATIONS

S. Cheng, Y. Jin, Y. Rao and D. P. Arnold, "An Active Voltage Doubling AC/DC Converter for Low-Voltage Energy Harvesting Applications," in IEEE Transactions on Power Electronics, vol. 26, No. 8, pp. 2258-2265, Aug. 2011.*
Davide Carli et al., "An Effective Multi-Source Energy Harvester for Low Power Applications," Design, Automation & Test in Europe Conference & Exhibition, pp. 1-6, Mar. 2011.

* cited by examiner

POWER MANAGEMENT APPARATUS AND MULTI-SOURCE ENERGY HARVESTING SYSTEM USING THE SAME

CROSS REFERENCE TO RELATED APPLICATION

This application claims the benefit of Korean Patent Application No. 10-2013-0102143, filed on Aug. 28, 2013, which is hereby incorporated by reference in its entirety into this application.

BACKGROUND OF THE INVENTION

1. Technical Field

The present invention relates generally to a power management apparatus and a multi-source energy harvesting system using the apparatus and, more particularly, to an apparatus and system that store power in a battery by inputting the power from two or more energy harvesting sources (power sources).

2. Description of the Related Art

As the miniaturization of peripheral devices has become more and more important nowadays, the supply of power has become a serious problem due to limited battery lifetime of the peripheral devices. It is inefficient to periodically replace a battery or recharge the battery in a device that must be operated for a long period of time because high cost and much time are required.

Technology for solving this problem is energy harvesting. Energy harvesting is technology for harvesting ambient wasted energy such as light, heat or vibration, converting harvested energy into electric energy, and utilizing such electric energy. At the present time at which environment-friendly energy is emphasized, such energy harvesting is increasingly attracting attention. Accordingly, energy harvesting systems for converting energy from various energy sources such as photovoltaic or solar devices, piezoelectric devices, or thermal energy converters into electric energy and supplying electric power without being supplied with external power have been presented in various manners.

In order to improve the performance of power supply in an energy harvesting system, the management and distribution of power by the energy harvesting system must be favorably performed upon simultaneously utilizing two or more energy sources. That is, in the energy harvesting system, it is important to efficiently supply harvested powers, input from two or more harvesting sources either simultaneously or at different times, to a battery or an electric energy storage device (hereinafter collectively referred to as a "battery") having the same function as the battery without wasting power.

Further, when an algorithm for a power management distribution circuit is implemented using a circuit, the complexity and power consumption thereof must be minimized.

As preceding technology related to this, there is technology which is published in the academic journal of Design, Automation & Test in Europe Conference & Exhibition in March, 2011 (entitled "An Effective Multi-Source Energy Harvester for Low Power Applications") and which supplies power to a load depending on the charge and discharge conditions of a battery in an energy harvesting system having a plurality of harvester inputs.

The technology disclosed in the academic journal ("An Effective Multi-Source Energy Harvester for Low Power Applications") is configured to select a harvester to be connected to a load using only a Schottky diode. In this case, since the Schottky diode is used, there is a high probability that power loss caused by the turning-on of the diode will occur.

SUMMARY OF THE INVENTION

Accordingly, the present invention has been made keeping in mind the above problems occurring in the prior art, and an object of the present invention is to provide a power management apparatus and a multi-source energy harvesting system using the apparatus, which manage power supplied by individual harvesting sources without wasting the power, thus efficiently distributing the power to a battery.

In accordance with an aspect of the present invention to accomplish the above object, there is provided a power management apparatus, including a plurality of comparison units configured to compare voltages of storage devices respectively connected to output terminals of a plurality of harvesting power sources with a preset threshold voltage; a control unit configured to control an operation of the power management apparatus; and a plurality of switching units installed between the respective storage devices and a battery and configured to be turned on/off in response to switching control signals output from the control unit and to form power transmission paths between corresponding storage devices and the battery, wherein the control unit generates and provides the switching control signals based on output signals of the plurality of comparison units.

Preferably, the control unit may include a frequency divider for dividing a frequency of an external clock by a certain number; a clock output unit for outputting a plurality of clocks having rising edges at different times based on the clocks output from the frequency divider; and a switching control signal generation circuit unit for generating and outputting switching control signals for the plurality of switching units based on the plurality of clocks output from the clock output unit and outputs of the plurality of comparison units.

Preferably, the switching control signal generation circuit unit may include D flip-flops of a first group for outputting signals generated in response to on the plurality of clocks output from the clock output unit and the external clock; logic gates for outputting resulting values obtained by performing a logic operation on output signals of the D flip-flops of the first group and output signals of the plurality of comparison units; and D flip-flops of a second group for receiving an output of the logic gate through asynchronous reset terminals thereof and outputting switching control signals for the plurality of switching units based on the output signals of the plurality of comparison units and the output signals of the D flip-flops of the first group.

Preferably, the D flip-flops of the first group may include a first D flip-flop for outputting a signal generated in response to a first clock of the clock output unit and the external clock; a second D flip-flop for outputting a signal generated in response to a second clock of the clock output unit and the external clock; and a third D flip-flop for outputting a signal generated in response to a third clock of the clock output unit and the external clock.

Preferably, the logic gates may include a first AND gate for outputting a resulting value obtained by performing a logic operation on the output signal of the first D flip-flop and an output signal of a first one of the plurality of comparison units; a second AND gate for outputting a resulting value obtained by performing a logic operation on the output signal of the second D flip-flop and an output signal of a second one of the plurality of comparison units;

a third AND gate for outputting a resulting value obtained by performing a logic operation based on the output signal of the third D flip-flop and an output signal of a third one of the plurality of comparison units; a first OR gate for outputting a resulting value obtained by performing a logic operation on output signals of the second AND gate and the third AND gate; a second OR gate for outputting a resulting value obtained by performing a logic operation on output signals of the first AND gate and the third AND gate; and a third OR gate for outputting a resulting value obtained by performing a logic operation on output signals of the first AND gate and the second AND gate.

Preferably, the D flip-flops of the second group may include a fourth D flip-flop for receiving an output of the first OR gate through an asynchronous reset terminal thereof, and outputting a control signal for a first one of the plurality of switching units based on an output signal of the first one of the plurality of comparison units and an output signal of the first D flip-flop; a fifth D flip-flop for receiving an output of the second OR gate through an asynchronous reset terminal thereof, and outputting a control signal for a second one of the plurality of switching units based on an output signal of the second one of the plurality of comparison units and an output signal of the second D flip-flop; and a sixth D flip-flop for receiving an output of the third OR gate through an asynchronous reset terminal thereof, and outputting a control signal for a third one of the plurality of switching units based on an output signal of the third one of the plurality of comparison units and an output signal of the third D flip-flop.

Preferably, the switching control signal generation circuit unit may include a first D flip-flop for outputting a signal generated in response to a first clock of the clock output unit and the external clock; a second D flip-flop for outputting a signal generated in response to a second clock of the clock output unit and the external clock; a first AND gate for outputting a resulting value obtained by performing a logic operation on the output signal of the first D flip-flop and an output signal of a first one of the plurality of comparison units; a second AND gate for outputting a resulting value obtained by performing a logic operation on the output signal of the second D flip-flop and an output signal of a second one of the plurality of comparison units; a third D flip-flop for receiving an output of the second AND gate through an asynchronous reset terminal thereof, and outputting a control signal for a first one of the plurality of switching units based on an output signal of the first one of the plurality of comparison units and the output signal of the first D flip-flop; and a fourth D flip-flop for receiving an output of the first AND gate through an asynchronous reset terminal thereof, and outputting a control signal for a second one of the plurality of switching units based on an output signal of the second one of the plurality of comparison units and the output signal of the second D flip-flop.

Preferably, each of the storage devices may be implemented using a capacitor.

Preferably, power supplied to the battery may be greater than power supplied by each of the plurality of harvesting power sources.

Preferably, the power management apparatus may further include a voltage doubler unit for amplifying an output of the control unit in accordance with intensities of ON/OFF control inputs for the plurality of switching units.

In accordance with another aspect of the present invention to accomplish the above object, there is provided a multi-source energy harvesting system, including a plurality of storage devices respectively connected to output terminals of a plurality of harvesting power sources, respectively, and configured to store respective outputs of the plurality of harvesting power sources; a battery configured to store power of the plurality of harvesting power sources; and a power management apparatus configured to transfer the power of the plurality of harvesting power sources to the battery, wherein the power management apparatus comprises a plurality of comparison units configured to compare voltages of the plurality of storage devices with a preset threshold voltage; a control unit configured to control an operation of the power management apparatus; and a plurality of switching units installed between the respective storage devices and the battery and configured to be turned on/off in response to switching control signals output from the control unit and to form power transmission paths between corresponding storage devices and the battery, wherein the control unit generates and provides the switching control signals based on output signals of the plurality of comparison units.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

Figure 1:
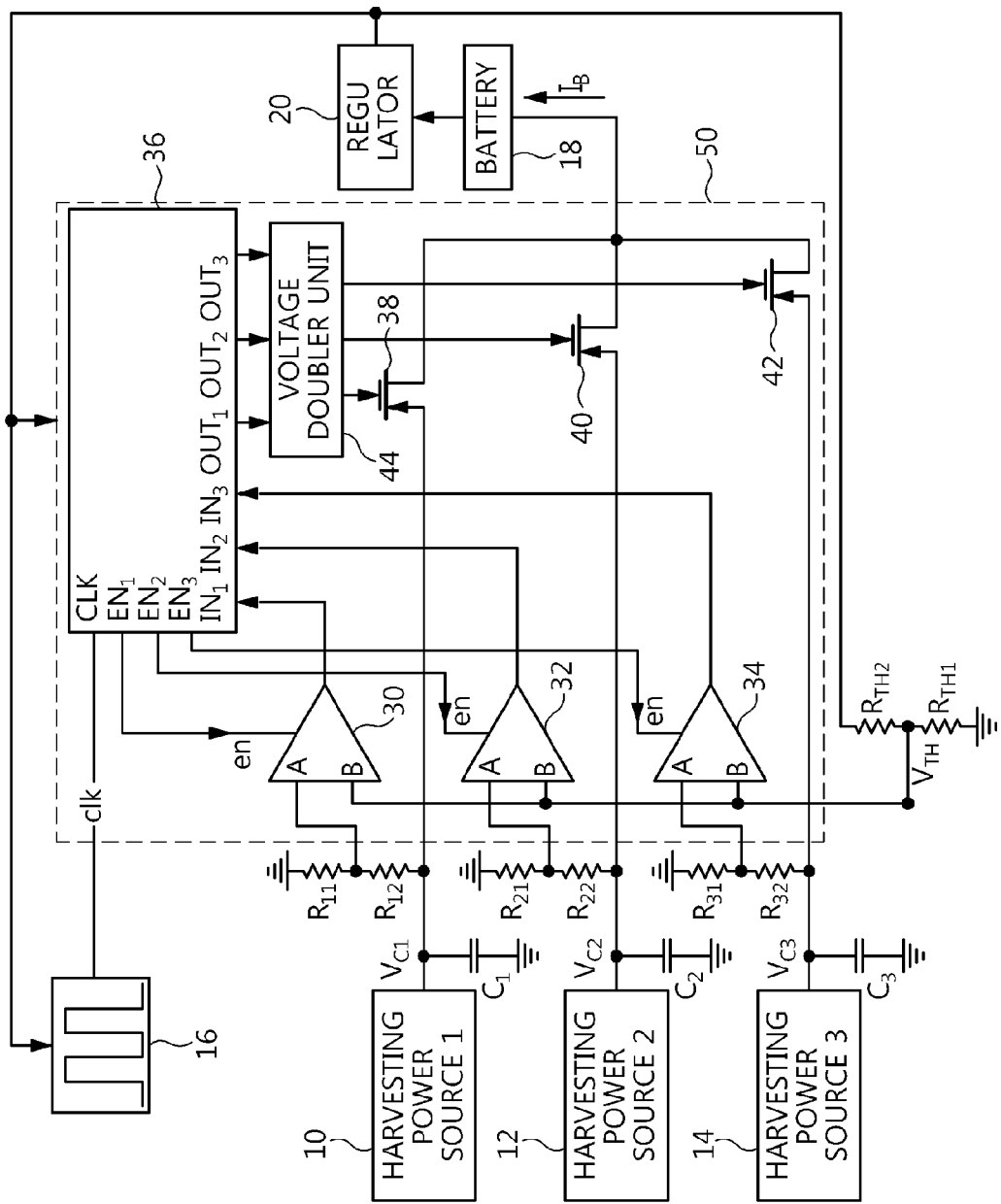
FIG. 1 is a configuration diagram showing a multi-source energy harvesting system according to an embodiment of the present invention.

The present invention may be variously changed and may have various embodiments, and specific embodiments will be described in detail below with reference to the attached drawings.

However, it should be understood that those embodiments are not intended to limit the present invention to specific disclosure forms and they include all changes, equivalents or modifications included in the spirit and scope of the present invention.

The terms used in the present specification are merely used to describe specific embodiments and are not intended to limit the present invention. A singular expression includes a plural expression unless a description to the contrary is specifically pointed out in context. In the present specification, it should be understood that the terms such as "include" or "have" are merely intended to indicate that features, numbers, steps, operations, components, parts, or combinations thereof are present, and are not intended to exclude a possibility that one or more other features, numbers, steps, operations, components, parts, or combinations thereof will be present or added.

Unless differently defined, all terms used here including technical or scientific terms have the same meanings as the terms generally understood by those skilled in the art to which the present invention pertains. The terms identical to those defined in generally used dictionaries should be interpreted as having meanings identical to contextual meanings of the related art, and are not interpreted as being ideal or excessively formal meanings unless they are definitely defined in the present specification.

Embodiments of the present invention will be described in detail with reference to the accompanying drawings. In the following description of the present invention, the same reference numerals are used to designate the same or similar elements throughout the drawings and repeated descriptions of the same components will be omitted.

FIG. 1 is a configuration diagram showing a multi-source energy harvesting system according to an embodiment of the present invention.

In FIG. 1, for easy understanding of the present invention, the number of multiple sources (that is, harvesting power sources) is assumed to be 3.

The multi-source energy harvesting system according to the embodiment of the present invention includes harvesting power sources 10, 12, and 14, a clock oscillator 16, a battery 18, a regulator 20, and a power management apparatus 50.

The harvesting power sources 10, 12, and 14 are power sources for supplying predetermined power for multi-source energy harvesting. The harvesting power sources 10, 12, and 14 may be identical or different energy sources. The harvesting power sources 10, 12, and 14 supply their own powers either simultaneously or at different times.

Storage devices (for example, capacitors) for storing the outputs of the corresponding power sources are connected to the output terminals of the respective harvesting power sources 10, 12, and 14. That is, a rechargeable capacitor $C_1$ is connected to the output terminal of the harvesting power source 10, a rechargeable capacitor $C_2$ is connected to the output terminal of the harvesting power source 12, and a rechargeable capacitor $C_3$ is connected to the output terminal of the harvesting power source 14.

The clock oscillator 16 provides a clock to the power management apparatus 50. The clock oscillator 16 is supplied with constant voltage power from the battery 18, which stores or uses harvesting power, via a regulator 20.

The power management apparatus 50 is configured to, when powers from the harvesting power sources 10, 12, and 14 are input either simultaneously or at different times and the multi-source energy harvesting system is operated, efficiently manage respective energy harvesting powers, and distribute and supply the energy harvesting powers to the battery 18. The power management apparatus 50 is supplied with constant voltage power from the battery 18, which stores or uses the harvesting power, via the regulator 20.

The intensities of powers supplied by (output from) the respective harvesting power sources 10, 12, and 14 are set based on the intensity of power supplied to the power management apparatus 50 after passing through a power supply circuit which performs a maximum power point tracking (MPPT) function or a similar function.

Further, in order to supply all of powers which are input from the plurality of harvesting power sources 10, 12, and 14 to the battery 18, the multi-source energy harvesting system according to an embodiment of the present invention sets the intensity of the power supplied to the battery 18 to a value greater than the power supplied to each of the harvesting power sources 10, 12, and 14.

In FIG. 1, the power management apparatus 50 includes comparison units 30, 32, and 34, a control unit 36, switches 38, 40, and 42, and a voltage doubler unit 44.

Each of the comparison units 30, 32, and 34 compares the voltage of the capacitor connected to the output terminal of the corresponding harvesting power source 10, 12, or 14 with a preset threshold voltage.

That is, the comparison unit 30 compares the voltage $V_{C1}$ of the capacitor $C_1$ connected to the output terminal of the harvesting power source 10 with a preset threshold voltage $V_{TH}$. The comparison unit 30 is operated in response to an enable signal en output from the control unit 36. The comparison unit 30 is operated only when the enable signal en is at a high level, thus preventing power from unnecessarily being consumed in an interval in which the operation of the comparison unit 30 is not required. If the voltage $V_{C1}$ of the capacitor $C_1$ is greater than the threshold voltage $V_{TH}$, the comparison unit 30 outputs a high level signal to the control unit 36, whereas if the voltage $V_{C1}$ of the capacitor $C_1$ is less than the threshold voltage $V_{TH}$, the comparison unit 30 outputs a low level signal to the control unit 36.

The comparison unit 32 compares the voltage $V_{C2}$ of the capacitor $C_2$ connected to the output terminal of the harvesting power source 12 with the preset threshold voltage $V_{TH}$. The comparison unit 32 is operated in response to the enable signal en output from the control unit 36. The comparison unit 32 is operated only when the enable signal en is at a high level, thus preventing power from being unnecessarily consumed in an interval in which the operation of the comparison unit 32 is not required. If the voltage $V_{C2}$ of the capacitor $C_2$ is higher than the threshold voltage $V_{TH}$, the comparison unit 32 outputs a high level signal to the control unit 36, whereas if the voltage $V_{C2}$ of the capacitor $C_2$ is less than the threshold voltage $V_{TH}$, the comparison unit 32 outputs a low level signal to the control unit 36.

The comparison unit 34 compares the voltage $V_{C3}$ of the capacitor $C_3$ connected to the output terminal of the harvesting power source 14 with the preset threshold voltage $V_{TH}$. The comparison unit 34 is operated in response to the enable signal en output from the control unit 36. The comparison unit 34 is operated only when the enable signal en is at a high level, thus preventing power from being unnecessarily consumed in an interval in which the operation of the comparison unit 34 is not required. If the voltage $V_{C3}$ of the capacitor $C_3$ is greater than the threshold voltage $V_{TH}$, the comparison unit 34 outputs a high level signal to the control unit 36, whereas if the voltage $V_{C3}$ of the capacitor $C_3$ is less than the threshold voltage $V_{TH}$, the comparison unit 34 outputs a low level signal to the control unit 36.

Here, the comparison units 30, 32, and 34 may be implemented as comparators, respectively. Any one of the capacitor voltages $V_{C1}$, $V_{C2}$, and $V_{C3}$ of is input to any one input terminal A of each comparison unit 30, 32, or 34 via a power distribution circuit composed of $R_{i1}$ and $R_{i2}$, and the threshold voltage $V_{TH}$ is input to the remaining input terminal B of the comparison unit 30, 32, or 34. Here, i denotes an integer indicating the number n of harvesting power sources ranging from 1, where i=1, 2, and 3 (n=3). The power distribution circuit composed of $R_{i1}$ and $R_{i2}$ is configured to, when the input voltage of the harvesting power source 10, 12, or 14 is greater than the operating voltage of the digital circuit of the power management apparatus 50, adjust the operating ranges of the input/output voltages between the harvesting power source and the power management apparatus, and to prevent power loss from occurring due to the voltage division circuit by using a high resistance value.

Further, the threshold voltage $V_{TH}$ satisfies the following equation:

$$V_{ci} \cdot \frac{R_{i1}}{R_{i1} + R_{i2}} \geq V_{bat} \cdot \frac{R_{TH1}}{R_{TH1} + R_{TH2}} = V_{TH}$$

where $R_{TH1}$ and $R_{TH2}$ are also implemented using a high resistance value so that power loss does not occur. $V_{bat}$ denotes the voltage of the battery 18. In actual implementation, a bandgap reference circuit for stably maintaining the threshold voltage $V_{TH}$ may be included.

The control unit 36 controls the operation of the algorithm of the corresponding power management apparatus 50. For example, the control unit 36 may be implemented as a Digital Control Unit (DCU).

Switches 38, 40, and 42 are respectively installed between the voltage terminals of the corresponding capacitors and the input terminal of the battery 18, and are turned on/off in response to switching control signals passing through the voltage doubler unit 44. For example, the switch 38 is disposed between the voltage terminal $V_{C1}$ of the capacitor $C_1$ and the input terminal of the battery 18, the switch 40 is disposed between the voltage terminal $V_{C2}$ of the capacitor $C_2$ and the input terminal of the battery 18, and the switch 42 is disposed between the voltage $V_{C3}$ of the capacitor $C_3$ and the input terminal of the battery 18. Here, respective first terminals of the switches 38, 40, and 42 are coupled in common and are connected to the input terminal of the battery 18.

The voltage doubler unit (Clock Voltage Doubler: CVD) 44 amplifies the output voltage of the control unit 36 in accordance with the intensities of the ON/OFF control inputs of the switches 38, 40, and 42.

Figure 2:
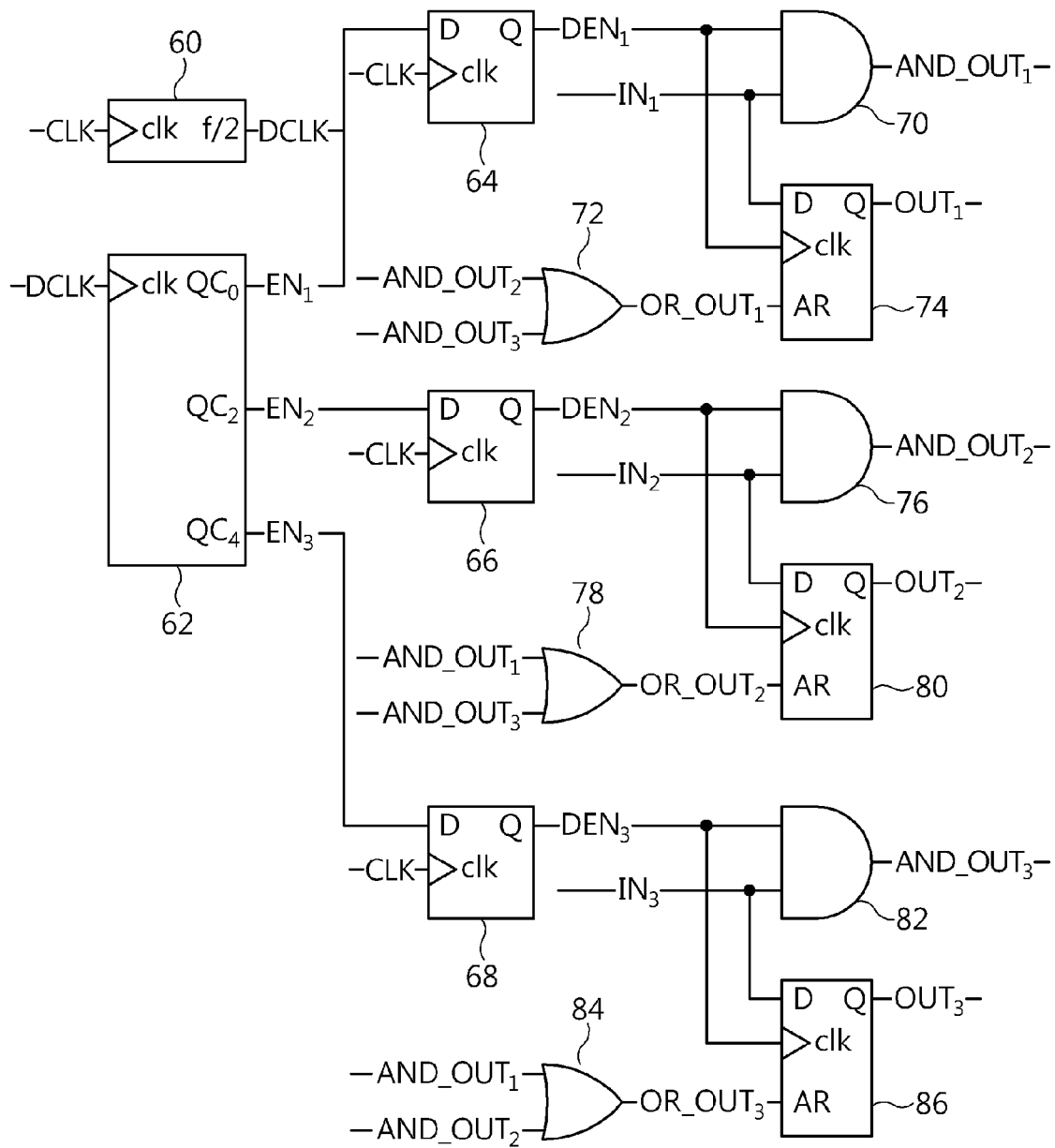
FIG. 2 is a diagram showing an example of the internal configuration of a control unit shown in FIG. 1.

FIG. 2 is a diagram showing an example of the internal configuration of the control unit 36 shown in FIG. 1.

The control unit 36 includes a frequency divider 60, a Johnson counter 62, D flip-flops 64, 66, 68, 74, 80, and 86, and logic gates 70, 72, 76, 78, 82, and 84.

The frequency divider 60 divides a clock frequency by a random number. In an embodiment of the present invention, the frequency divider 60 is assumed to divide the clock frequency by 2, that is, to obtain ½ of clock frequency. In detail, the frequency divider 60 is configured to, when a clock clk from the clock oscillator 16 is input to the clock terminal CLK of the control unit 36, divide the frequency of the clock CLK by 2, and output a clock DCLK having a frequency corresponding to ½ of the clock frequency to the Johnson counter 62.

The Johnson counter 62 receives the clock DCLK from the frequency divider 60 and outputs an m(m=2*n, n=3)-bit signal. It is apparent that the internal configuration of the Johnson counter 62 may be sufficiently understood by those skilled in the art from well-known technology. The output of the Johnson counter 62 is used to generate enable signals. That is, the Johnson counter 62 outputs enable signals $EN_1$, $EN_2$, and $EN_3$ at a predetermined level (for example, a high level ("1") or a low level ("0")). In this case, three enable signals $EN_1$, $EN_2$, and $EN_3$ sequentially make a transition to a high level and then make a transition to a low level while being temporally shifted from each other, without simultaneously making a transition to a high level. For example, the present invention may take a scheme in which, after the enable signal $EN_1$ first makes a transition to a high level and make a transition to a low level, the enable signal $EN_2$ makes a transition to a high level and makes a transition to a low level, and then the enable signal $EN_3$ makes a transition to a high level and makes a transition to a low level. Consequently, the Johnson counter 62 may be regarded as outputting a plurality of clocks (that is, the enable signals $EN_1$, $EN_2$, and $EN_3$), the rising edges of which occur at different times, based on the clock output from the frequency divider 60. The above-described Johnson counter 62 may be an example of a clock output unit described in the accompanying claims of the present invention.

When "1" is input to the input terminals D of the D flip-flops 64, 66, and 68, and a high level clock is input to the clock terminals clk thereof, "1" is output through the output terminals Q thereof. That is, the D flip-flop 64 receives the enable signal $EN_1$ output from the Johnson counter 62 and the clock output from the clock oscillator 16, and outputs an output signal $DEN_1$ having a predetermined signal level, based on the signal levels of the enable signal $EN_1$ and the clock. The D flip-flop 66 receives the enable signal $EN_2$ output from the Johnson counter 62 and the clock output from the clock oscillator 16, and outputs an output signal $DEN_2$ having a predetermined signal level, based on the signal levels of the enable signal $EN_2$ and the clock. The D flip-flop 68 receives the enable signal $EN_3$ output from the Johnson counter 62 and the clock output from the clock oscillator 16, and outputs an output signal $DEN_3$ having a predetermined signal level, based on the signal levels of the enable signal $EN_3$ and the clock.

The AND gate 70 receives the output signal $DEN_1$ of the D flip-flop 64 and the output signal of the comparison unit 30, performs a logic operation on the received signals, and outputs a resulting value $AND\_OUT_1$.

The OR gate 72 receives the output signal $AND\_OUT_2$ of the AND gate 76 and the output signal $AND\_OUT_3$ of the AND gate 82, performs a logic operation on the received signals, and outputs a resulting value $OR\_OUT_1$.

The D flip-flop 74 has an asynchronous reset function. The terminal D of the D flip-flop 74 is connected to the output terminal of the comparison unit 30, the clock terminal clk of the D flip-flop 74 is connected to the output terminal Q of the D flip-flop 64, and the terminal AR of the D flip-flop 74 is connected to the output terminal of the OR gate 72. Therefore, when "1" is connected to the terminal D of the D flip-flop 74, and a high level clock is input to the clock terminal clk thereof, "1" is output through the output terminal Q thereof. However, when "1" is input to the terminal AR, "0" is output through the output terminal Q of the D flip-flop 74 regardless of the input of the clock and the value of the terminal D. Here, the output signal $OUT_1$ of the D flip-flop 74 is transferred, as a switching control signal for the switch 38, to the voltage doubler unit 44.

The AND gate 76 receives the output signal $DEN_2$ of the D flip-flop 66 and the output signal of the comparison unit 32, performs a logic operation on the received signals, and outputs a resulting value $AND\_OUT_2$.

The OR gate 78 receives the output $AND\_OUT_1$ of the AND gate 70 and the output $AND\_OUT_3$ of the AND gate 82, performs a logic operation on the received signals, and outputs a resulting value $OR\_OUT_2$.

The D flip-flop 80 has an asynchronous reset function. The terminal D of the D flip-flop 80 is connected to the output terminal of the comparison unit 32, the clock terminal clk thereof is connected to the output terminal Q of the D flip-flop 66, and the terminal AR thereof is connected to the output terminal of the OR gate 78. Therefore, when "1" is input to the terminal D of the D flip-flop 80, and a high-level clock is input to the clock terminal clk, "1" is output through the output terminal Q. But, when "1" is input through the terminal AR, "0" is output through the output terminal Q regardless of the input of the clock and the value of the terminal D. The output signal $OUT_2$ of the D flip-flop 80 is transferred, as a switching control signal for the switch 40, to the voltage doubler unit 44.

The AND gate 82 receives the output signal $DEN_3$ of the D flip-flop 68 and the output signal of the comparison unit 34, performs a logic operation on the received signals, and outputs a resulting value $AND\_OUT_3$.

The OR gate 84 receives the output signal $AND\_OUT_1$ of the AND gate 70 and the output signal $AND\_OUT_2$ of the AND gate 76, performs a logic operation on the received signals, and outputs a resulting value $OR\_OUT_3$.

The D flip-flop 86 has an asynchronous reset function. The terminal D of the D flip-flop 86 is connected to the output terminal of the comparison unit 34, the clock terminal clk thereof is connected to the output terminal Q of the D flip-flop 68, and the terminal AR thereof is connected to the output terminal of the OR gate 84. Therefore, when "1" is input to the terminal D of the D flip-flop 86 and a high level clock is input to the clock terminal clk, "1" is output through the output terminal Q. However, when "1" is input to the terminal AR, "0" is output through the output terminal Q regardless of the input of the clock and the value of the terminal D. Here, the output signal $OUT_3$ of the D flip-flop 86 is transferred, as a switching control signal for the switch 42, to the voltage doubler unit 44.

In FIG. 2, the Johnson counter 62 is a 6-bit Johnson counter, wherein, when the output bits of the Johnson counter 62 are QC0 to QC5 in sequence, QC1, QC3, and QC5 are not used so as to prevent the input signals and the asynchronous reset signals of the D flip-flops 74, 80, and 86 from conflicting with each other. Generally, in the case of an m-bit Johnson counter, only even-numbered bits or odd-numbered bits of the output bits are selectively used.

The above-described D flip-flops 64, 66, 68, 74, 80, and 86 and the logic gates 70, 72, 76, 78, 82, and 84 are examples of the switching control signal generation circuit unit described in the accompanying claims of the present invention. That is, the switching control signal generation circuit unit generates and outputs switching control signals for a plurality of switches 38, 40, and 42 based on the plurality of clocks output from the Johnson counter 62 and the outputs of the plurality of comparison units 30, 32, and 34. In this way, it may be considered that the switching control signal generation circuit unit includes the above-described D flip-flops 64, 66, 68, 74, 80, and 86 and the logic gates 70, 72, 76, 78, 82, and 84 so as to perform its own function.

Below, the switching control signal generation circuit unit will be described in detail. It may be considered that the switching control signal generation circuit unit includes D flip-flops of a first group, logic gates, and D flip-flops of a second group. The D flip-flops of the first group output different signals in response to a plurality of clocks output from the Johnson counter 62 and an external clock (that is, the clock of the clock oscillator 16). The logic gates output resulting values obtained by performing logic operations on the output signals of the D flip-flops of the first group and the output signals of the plurality of comparison units 30, 32, and 34. The D flip-flops of the second group receive the outputs of the logic gates through their asynchronous reset terminals and output switching control signals for a plurality of switching units based on the output signals of the comparison units and the output signals of the D flip-flops of the first group. Here, the D flip-flops of the first group may be the D flip-flops 64, 66, and 68, the logic gates may be the AND gates 70, 76, and 82 and the OR gates 72, 78, and 84, and the D flip-flops of the second group may be the D flip-flops 74, 80, and 86.

The operation of the control unit 36 shown in FIG. 2 will be described in detail below with reference to FIG. 1.

When i=1, the frequency divider 60 applies a clock DCLK having a frequency corresponding to half of the frequency of a clock CLK to the Johnson counter 62, and the Johnson counter 62 changes the level of the output signal $EN_1$ to a high level in response to the clock DCLK. In this case, the comparison unit 30 is enabled to compare the magnitudes of inputs $V_{C1}$ and $V_{TH}$ with each other.

Here, the check period of the clock DCLK is defined as Δt, which may be represented by the following Equation:

$$\Delta t \cong C_i \cdot \frac{V_{TH} - V_{BATT}}{I_B} = C_i \cdot R_{BIN} = \tau_i$$

where $I_B$ may be given by the following Equation:

$$I_B = (V_{TH} - V_{BATT})/R_{Bin}$$

where $I_B$ denotes the charging current of the battery 18 and $R_{Bin}$ denotes the internal resistance of the battery. Here, in order to adjust the charging current $I_B$ of the battery, a resistor may be included between the output terminals of the switches 38, 40, and 42 and the input terminal of the battery 18. Further, when a battery having a voltage higher than the output voltages of the respective switches 38, 40, and 42 is connected, a Direct Current (DC)-DC converter may be included between the output terminals of the switches 38, 40, and 42 and the input terminal of the battery 18 so as to charge the battery.

Further, time corresponding to the period of the clock DCLK×2 must be shorter than Δt. In the above description, Δt has been defined as the check period, but may also be designated as a check cycle.

When the output signal $DEN_1$ delayed by the clock CLK at the D flip-flop 64 is input as the clock of the D flip-flop 74, the output signal $OUT_1$ of the D flip-flop 74 makes a transition to a high state if the output signal $IN_1$ of the comparison unit 30 is in a high state. Accordingly, the switch 38 is turned on and closed by the voltage doubler unit 44, and then a power transmission path is formed between the capacitor C connected to the harvesting power source 10 and the battery 18. In this case, the high level output signal $AND\_OUT_1$ of the AND gate 70 resets the remaining D flip-flops 80 and 86, thus turning off all the switches that have been previously connected.

However, when the output signal of the comparison unit 30 is in a low state, the level of the output signal of the D flip-flop that was previously in the high state is maintained without change, and thus the state of the connection between the capacitor and the battery that was previously made is maintained without change.

The above-described procedure is equally performed for i=2 and 3, and then is repeated from i=1.

Figure 3:
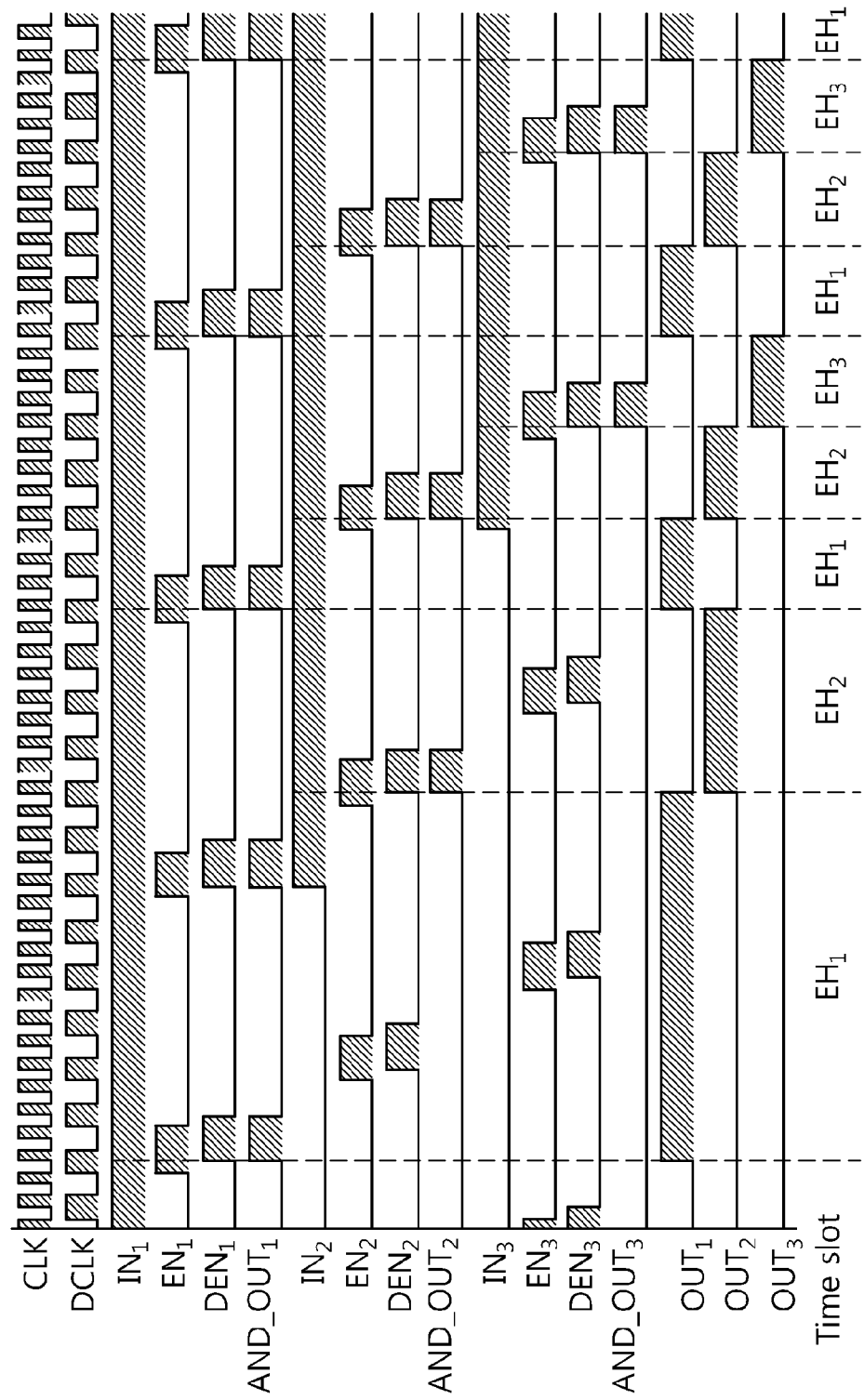
FIG. 3 is a timing diagram showing the operation of the control unit of FIG. 2.

FIG. 3 is a timing diagram showing the operation of the control unit 36 of FIG. 2.

A time slot indicated in the lower portion of FIG. 3 denotes a time interval in which the corresponding harvesting power source (Energy Harvester i, $EH_i$, i=1, 2, 3) is connected to the battery 18.

On the rising edges of first enable signals $DEN_1$ to $DEN_3$ (that is, a first cycle), only $IN_1$ is in a high state, and only $OUT_1$ is in a high state.

On the rising edges of second enable signals $DEN_1$ to $DEN_3$ (that is, a second cycle), $IN_1$ and $IN_2$ are in a high state, and $IN_3$ is in a low state even on the rising edge of $DEN_3$, and thus $OUT_2$ is maintained in a high state.

On the rising edges of third enable signals $DEN_1$ to $DEN_3$ (that is, a third cycle) and since then, all of $IN_1$, $IN_2$, and $IN_3$ are in a high state, so that $OUT_1$, $OUT_2$, and $OUT_3$ sequentially make a transition to a high state in response to the corresponding signals DEN, and thus the time interval is trisected.

Figure 4:
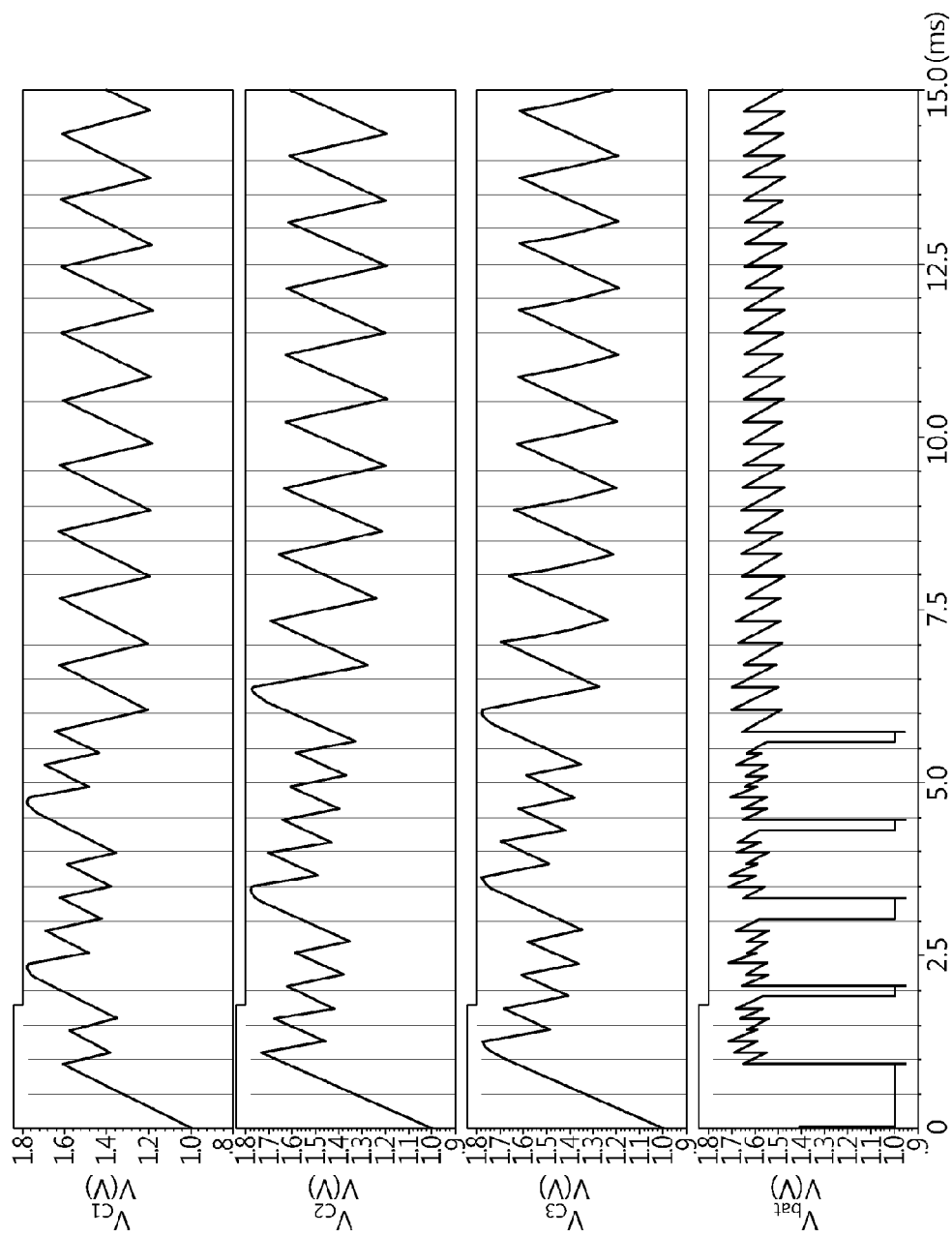
FIG. 4 is a waveform diagram showing the results of simulation of the power management apparatus shown in FIG. 1.

FIG. 4 is a waveform diagram showing the results of the simulation of the power management apparatus 50 shown in FIG. 1, wherein results obtained by simulating the circuit configurations of FIGS. 1 and 2 using Cadence's simulation tool (Cadence spectre) are presented.

A measurement environment is given such that three harvesting power sources (energy harvesters) are used, the input voltage range of each $V_{Ci}$ is set to a range from 0 V to 3.3 V, the supply voltage of a digital circuit is set to 1.2 V, $\Delta t \cong 300$ µs is set, the supply power of each harvesting power source is set to 10 µW, $V_{TH}$=1.6 V, $V_{a=bat}$=1.2V, the period of the clock CLK is 40 µs, the charging power of the battery is set to about 30 µW, $R_{i1}$=120 Mohm, and $R_{i2}$=210 Mohm.

As illustrated in FIG. 4, if a change in voltage is stabilized after 6 ms, it can be seen that supply voltage and charging voltage are maintained at a constant level. Therefore, it can be seen that power supplied by the three harvesting power sources, that is, 10 µW×3=30 µW, continuously charges the battery, without causing leakage power.

Depending on the characteristics of parts used in the configuration of a circuit, power consumption in the power management apparatus may vary, but when a System-on-Chip (SoC) is manufactured using a Taiwan Semiconductor Manufacturing Company (TSMC) 0.13 µm process, power consumption including an external clock is about 1 µW under the conditions presented in the simulation. Therefore, power transmission efficiency at this time is as high as efficiency of the transmitted power/(input power+circuit power consumption)×100(%)=30 µW/31 µW×100(%) =96.7%.

Figure 5:
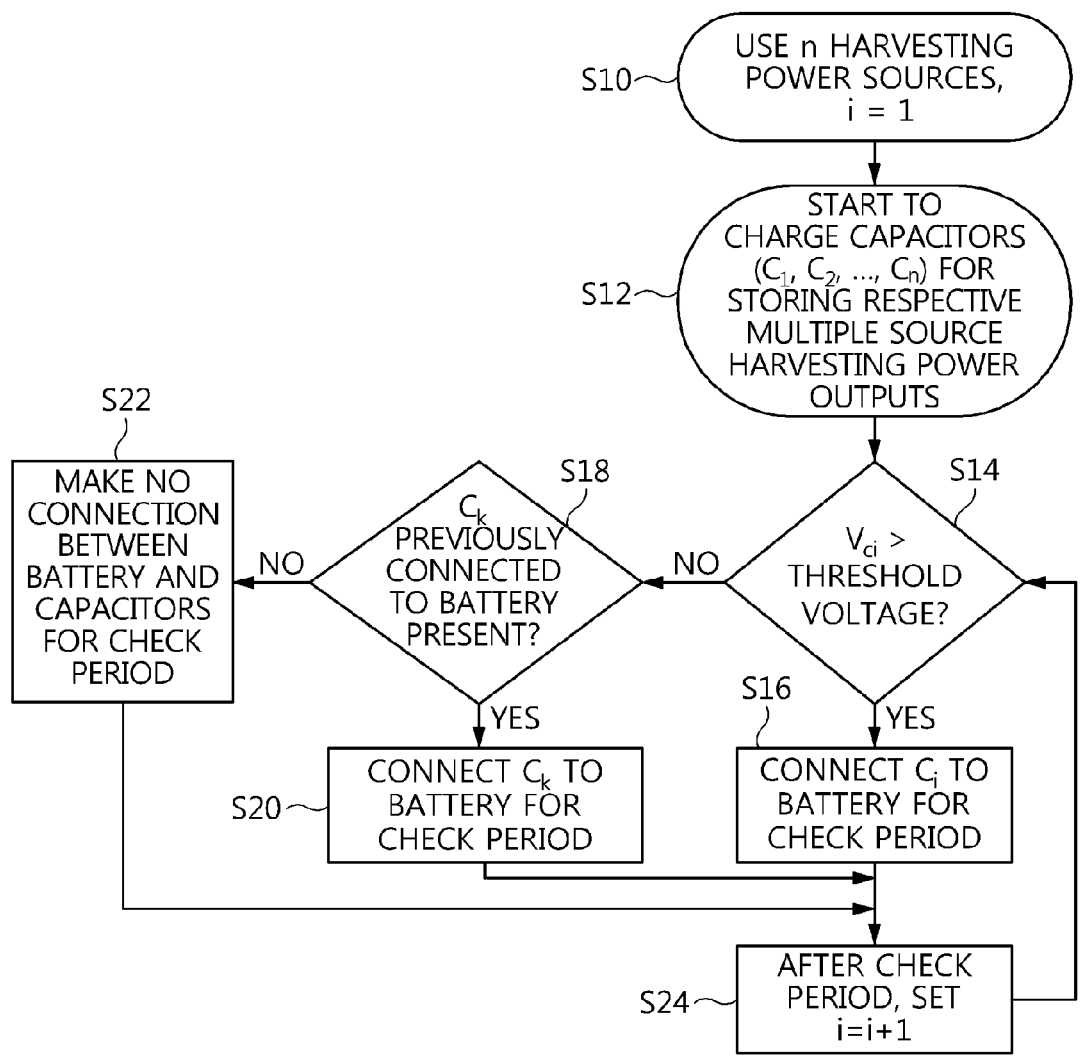
FIG. 5 is a flowchart showing the operation of the power management apparatus according to an embodiment of the present invention.

FIG. 5 is a flowchart showing the operation of the power management apparatus according to an embodiment of the present invention. In detail, FIG. 5 illustrates the flowchart of an algorithm indicating a method of efficiently managing respective energy harvesting powers and distributing and supplying the powers to the battery when powers from n harvesting power sources that use identical or different energy sources are input to the energy harvesting system either simultaneously or different times, and the energy harvesting system is operated.

The operation flow of the power management apparatus of FIG. 5 according to the embodiment of the present invention is described below.

First, at step S10, energy harvesting is initiated using n multiple source inputs (harvesting power source inputs), where i is initialized to "1" and i=1, 2, . . . , n.

At step S12, capacitors $C_i$ for storing the outputs of respective multiple source harvesting powers start to be charged with electric charges.

Then, at step S14, it is determined whether the voltage $V_{ci}$ of the corresponding capacitor $C_i$ is greater or less than the threshold voltage $V_{TH}$. These voltages may be compared by the comparison unit 30, 32, or 34.

If it is determined that the voltage $V_{Ci}$ of the capacitor $C_i$ is greater than the threshold voltage $V_{TH}$ (Yes at step S14), a signal corresponding to such a comparison result is transmitted to the control unit 36. The control unit 36 turns on the corresponding switch (one of switches 38, 40, and 42) via the voltage doubler unit 44. Accordingly, at step S16, during the check period $\Delta t$, the capacitor $C_i$ and the battery 18 are connected to each other.

As the capacitor $C_i$ and the battery 18 are connected to each other, power is supplied to the battery 18, and the capacitor $C_i$ is discharged (since power supplied to the battery is greater than each harvesting power, the voltage of the capacitor $C_i$ is decreased). In this case, capacitors other than the capacitor $C_i$ are charged.

In contrast, if the voltage $V_{Ci}$ of the capacitor $C_i$ is less than or equal to the threshold voltage $V_{TH}$ (No at step S14), it is determined whether there is another capacitor ($C_k$, k=1, 2, . . . , n, k≠i) that is previously connected to the battery 18 in addition to the capacitor $C_i$ at step S18.

At step S18, if it is determined that there is another capacitor ($C_k$, k=1, 2, . . . , n, k≠i) that is previously connected to the battery 18 in addition to the capacitor $C_i$, the other capacitor $C_k$ is connected to the battery 18 (or the connection is maintained) for the check period $\Delta t$ at step S20. In this case, capacitors $C_j$ other than the capacitor $C_k$ are charged.

Meanwhile, if it is determined that there is no capacitor previously connected to the battery 18 in addition to the capacitor $C_i$ (No at step S18), no connection is made between all capacitors and the battery 18 for the check period $\Delta t$ and all the capacitors are charged at step S22.

Finally, at step S24, after the check period $\Delta t$, the above procedure is repeatedly performed on a subsequent capacitor via i=i+1, and i is initialized to 1 (i=1) when i=n.

Figure 6:
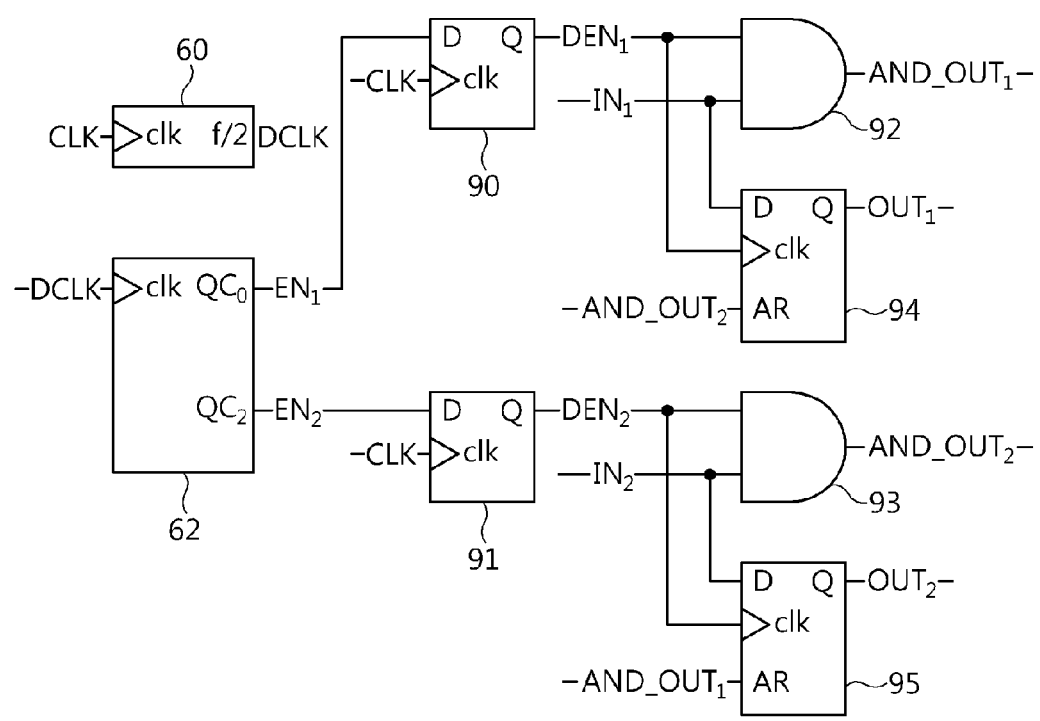
FIG. 6 is a diagram showing a modification of FIG. 2.

FIG. 6 is a diagram showing a modification of FIG. 2. FIG. 2 illustrates the internal configuration of the control unit when the number of harvesting power sources is 3, whereas FIG. 6 illustrates the internal configuration of the control unit when the number of harvesting power sources is 2.

When the number of harvesting power sources is 2, the control unit includes a frequency divider 60, a Johnson counter 62, and a switching control signal generation circuit unit. Compared to the case where the number of harvesting power sources is 3, there is a difference in the internal configuration of the switching control signal generation circuit unit.

That is, when the number of harvesting power sources is two, the switching control signal generation circuit unit of the control unit includes first to fourth flip-flops 90, 91, 94, and 95, and first and second AND gates 92 and 93. The first flip-flop 90 outputs a signal in response to a first clock $EN_1$ output from a clock output unit (that is, the Johnson counter 62) and a clock output from the clock oscillator 16. The second flip-flop 91 outputs a signal in response to a second clock $EN_2$ output from the clock output unit (that is, the Johnson counter 62) and the clock output from the clock oscillator 16. The first AND gate 92 outputs a resulting value obtained by performing a logic operation on the output signal of the first D flip-flop 90 and the output signal of any one of a plurality of comparison units (for example, comparison unit 30). The second AND gate 93 outputs a resulting value obtained by performing a logic operation on the output signal of the second D flip-flop 91 and the output signal of another one (for example, comparison unit 32) of the plurality of comparison units. The third D flip-flop 94 receives the output of the second AND gate 93 through the asynchronous reset terminal thereof, and outputs a control signal for any one switch 38 of a plurality of switches based on the output signal of any one of the plurality of comparison units (for example, comparison unit 30) and the output signal of the first D flip-flop 90. The fourth D flip-flop 95 receives the output of the first AND gate 92 through the asynchronous reset terminal thereof and outputs a control signal for another switch 40 of the plurality of switches, based on the output signal of the comparison unit 32 of the plurality of comparison units and the output signal of the second D flip-flop 91.

Meanwhile, it is apparent that, when the number of harvesting power sources is two, the number of comparison units and the number of switches must also be two.

In accordance with the present invention having the above configuration, there is an advantage in that when a plurality of harvesting powers using identical or different energy sources are input and supplied either simultaneously or at different times through a power management apparatus that has an uncomplicated structure and is operated at low power, the supplied power may be efficiently managed, and distributed and supplied to the battery.

As described above, optimal embodiments of the present invention have been disclosed in the drawings and the specification. Although specific terms have been used in the present specification, these are merely intended to describe the present invention and are not intended to limit the meanings thereof or the scope of the present invention described in the accompanying claims. Therefore, those skilled in the art will appreciate that various modifications and other equivalent embodiments are possible from the embodiments. Therefore, the technical scope of the present invention should be defined by the technical spirit of the claims.

What is claimed is:

1. A power management apparatus, comprising:
   a plurality of comparison units configured to compare voltages of storage devices respectively connected to output terminals of a plurality of harvesting power sources with a preset threshold voltage;
   a control unit configured to control an operation of the power management apparatus; and
   a plurality of switching units installed between the respective storage devices and a battery and configured to be turned on/off in response to switching control signals output from the control unit and to form power transmission paths between corresponding storage devices and the battery,
   wherein the control unit generates and provides the switching control signals based on output signals of the plurality of comparison units,
   wherein the control unit comprises:
   a frequency divider for dividing a frequency of an external clock by a certain number;
   a clock output unit for outputting a plurality of clocks having rising edges at different times based on the clocks output from the frequency divider; and
   a switching control signal generation circuit unit for generating and outputting switching control signals for the plurality of switching units based on the plurality of clocks output from the clock output unit and outputs of the plurality of comparison units, and
   wherein the switching control signal generation circuit unit comprises:
   D flip-flops of a first group for outputting signals generated in response to on the plurality of clocks output from the clock output unit and the external clock;
   logic gates for outputting resulting values obtained by performing a logic operation on output signals of the D flip-flops of the first group and output signals of the plurality of comparison units; and
   D flip-flops of a second group for receiving an output of the logic gate through asynchronous reset terminals thereof and outputting switching control signals for the plurality of switching units based on the output signals of the plurality of comparison units and the output signals of the D flip-flops of the first group.

2. The power management apparatus of claim 1, wherein the D flip-flops of the first group comprise:
   a first D flip-flop for outputting a signal generated in response to a first clock of the clock output unit and the external clock;
   a second D flip-flop for outputting a signal generated in response to a second clock of the clock output unit and the external clock; and
   a third D flip-flop for outputting a signal generated in response to a third clock of the clock output unit and the external clock.

3. The power management apparatus of claim 2, wherein the logic gates comprise:
   a first AND gate for outputting a resulting value obtained by performing a logic operation on the output signal of the first D flip-flop and an output signal of a first one of the plurality of comparison units;
   a second AND gate for outputting a resulting value obtained by performing a logic operation on the output signal of the second D flip-flop and an output signal of a second one of the plurality of comparison units;
   a third AND gate for outputting a resulting value obtained by performing a logic operation based on the output signal of the third D flip-flop and an output signal of a third one of the plurality of comparison units;
   a first OR gate for outputting a resulting value obtained by performing a logic operation on output signals of the second AND gate and the third AND gate;
   a second OR gate for outputting a resulting value obtained by performing a logic operation on output signals of the first AND gate and the third AND gate; and
   a third OR gate for outputting a resulting value obtained by performing a logic operation on output signals of the first AND gate and the second AND gate.

4. The power management apparatus of claim 3, wherein the D flip-flops of the second group comprise:
   a fourth D flip-flop for receiving an output of the first OR gate through an asynchronous reset terminal thereof, and outputting a control signal for a first one of the plurality of switching units based on an output signal of the first one of the plurality of comparison units and an output signal of the first D flip-flop;
   a fifth D flip-flop for receiving an output of the second OR gate through an asynchronous reset terminal thereof, and outputting a control signal for a second one of the plurality of switching units based on an output signal of the second one of the plurality of comparison units and an output signal of the second D flip-flop; and
   a sixth D flip-flop for receiving an output of the third OR gate through an asynchronous reset terminal thereof, and outputting a control signal for a third one of the plurality of switching units based on an output signal of the third one of the plurality of comparison units and an output signal of the third D flip-flop.

5. The power management apparatus of claim 1, wherein the switching control signal generation circuit unit comprises:
   a first D flip-flop for outputting a signal generated in response to a first clock of the clock output unit and the external clock;

a second D flip-flop for outputting a signal generated in response to a second clock of the clock output unit and the external clock;

a first AND gate for outputting a resulting value obtained by performing a logic operation on the output signal of the first D flip-flop and an output signal of a first one of the plurality of comparison units;

a second AND gate for outputting a resulting value obtained by performing a logic operation on the output signal of the second D flip-flop and an output signal of a second one of the plurality of comparison units;

a third D flip-flop for receiving an output of the second AND gate through an asynchronous reset terminal thereof, and outputting a control signal for a first one of the plurality of switching units based on an output signal of the first one of the plurality of comparison units and the output signal of the first D flip-flop; and a fourth D flip-flop for receiving an output of the first AND gate through an asynchronous reset terminal thereof, and outputting a control signal for a second one of the plurality of switching units based on an output signal of the second one of the plurality of comparison units and the output signal of the second D flip-flop.

6. The power management apparatus of claim 1, wherein each of the storage devices is implemented using a capacitor.

7. The power management apparatus of claim 1, wherein power supplied to the battery is greater than power supplied by each of the plurality of harvesting power sources.

8. The power management apparatus of claim 1, further comprising a voltage doubler unit for amplifying an output of the control unit in accordance with intensities of ON/OFF control inputs for the plurality of switching units.

9. A multi-source energy harvesting system, comprising:
a plurality of storage devices respectively connected to output terminals of a plurality of harvesting power sources, respectively, and configured to store respective outputs of the plurality of harvesting power sources;
a battery configured to store power of the plurality of harvesting power sources; and
a power management apparatus configured to transfer the power of the plurality of harvesting power sources to the battery,
wherein the power management apparatus comprises:
a plurality of comparison units configured to compare voltages of the plurality of storage devices with a preset threshold voltage;
a control unit configured to control an operation of the power management apparatus; and
a plurality of switching units installed between the respective storage devices and the battery and configured to be turned on/off in response to switching control signals output from the control unit and to form power transmission paths between corresponding storage devices and the battery,
wherein the control unit generates and provides the switching control signals based on output signals of the plurality of comparison units,
wherein the control unit comprises:
a frequency divider for dividing a frequency of an external clock by a certain number;
a clock output unit for outputting a plurality of clocks having rising edges at different times based on the clocks output from the frequency divider; and
a switching control signal generation circuit unit for generating and outputting switching control signals for the plurality of switching units based on the plurality of clocks output from the clock output unit and outputs of the plurality of comparison units, and wherein the switching control signal generation circuit unit comprises:
D flip-flops of a first group for outputting signals generated in response to on the plurality of clocks output from the clock output unit and the external clock;
logic gates for outputting resulting values obtained by performing a logic operation on output signals of the D flip-flops of the first group and output signals of the plurality of comparison units; and
D flip-flops of a second group for receiving an output of the logic gate through asynchronous reset terminals thereof and outputting switching control signals for the plurality of switching units based on the output signals of the plurality of comparison units and the output signals of the D flip-flops of the first group.

10. The multi-source energy harvesting system of claim 9, wherein the D flip-flops of the first group comprise:
a first D flip-flop for outputting a signal generated in response to a first clock of the clock output unit and the external clock;
a second D flip-flop for outputting a signal generated in response to a second clock of the clock output unit and the external clock; and
a third D flip-flop for outputting a signal generated in response to a third clock of the clock output unit and the external clock.

11. The multi-source energy harvesting system of claim 10, wherein the logic gates comprise:
a first AND gate for outputting a resulting value obtained by performing a logic operation on the output signal of the first D flip-flop and an output signal of a first one of the plurality of comparison units;
a second AND gate for outputting a resulting value obtained by performing a logic operation on the output signal of the second D flip-flop and an output signal of a second one of the plurality of comparison units;
a third AND gate for outputting a resulting value obtained by performing a logic operation based on the output signal of the third D flip-flop and an output signal of a third one of the plurality of comparison units;
a first OR gate for outputting a resulting value obtained by performing a logic operation on output signals of the second AND gate and the third AND gate;
a second OR gate for outputting a resulting value obtained by performing a logic operation on output signals of the first AND gate and the third AND gate; and
a third OR gate for outputting a resulting value obtained by performing a logic operation on output signals of the first AND gate and the second AND gate.

12. The multi-source energy harvesting system of claim 11, wherein the D flip-flops of the second group comprise:
a fourth D flip-flop for receiving an output of the first OR gate through an asynchronous reset terminal thereof, and outputting a control signal for a first one of the plurality of switching units based on an output signal of the first one of the plurality of comparison units and an output signal of the first D flip-flop;
a fifth D flip-flop for receiving an output of the second OR gate through an asynchronous reset terminal thereof, and outputting a control signal for a second one of the plurality of switching units based on an output signal of the second one of the plurality of comparison units and an output signal of the second D flip-flop; and
a sixth D flip-flop for receiving an output of the third OR gate through an asynchronous reset terminal thereof, and outputting a control signal for a third one of the plurality of switching units based on an output signal of the third one of the plurality of comparison units and an output signal of the third D flip-flop.

13. The multi-source energy harvesting system of claim 9, wherein the switching control signal generation circuit unit comprises:
- a first D flip-flop for outputting a signal generated in response to on a first clock of the clock output unit and the external clock;
- a second D flip-flop for outputting a signal generated in response to on a second clock of the clock output unit and the external clock;
- a first AND gate for outputting a resulting value obtained by performing a logic operation on the output signal of the first D flip-flop and an output signal of a first one of the plurality of comparison units;
- a second AND gate for outputting a resulting value obtained by performing a logic operation on the output signal of the second D flip-flop and an output signal of a second one of the plurality of comparison units;
- a third D flip-flop for receiving an output of the second AND gate through an asynchronous reset terminal thereof, and outputting a control signal for a first one of the plurality of switching units based on an output signal of the first one of the plurality of comparison units and the output signal of the first D flip-flop; and
- a fourth D flip-flop for receiving an output of the first AND gate through an asynchronous reset terminal thereof, and outputting a control signal for a second one of the plurality of switching units based on an output signal of the second one of the plurality of comparison units and the output signal of the second D flip-flop.

14. The multi-source energy harvesting system of claim 9, wherein each of the plurality of storage devices is implemented using a capacitor.

15. The multi-source energy harvesting system of claim 9, wherein power supplied to the battery is greater than power supplied by each of the plurality of harvesting power sources.

16. The multi-source energy harvesting system of claim 9, wherein the power management apparatus further comprises a voltage doubler unit for amplifying an output of the control unit in accordance with intensities of ON/OFF control inputs for the plurality of switching units.

* * * * *